United States Patent
Dakroub et al.

(10) Patent No.: US 8,687,311 B2
(45) Date of Patent: Apr. 1, 2014

(54) ADJUSTING A PREAMP WRITE CURRENT TO APPLY AN ASYMMETRIC SIGNAL AT A WRITE HEAD

(75) Inventors: Housan Dakroub, Shakopee, MN (US); Todd Michael Lammers, Lafayette, CO (US); Thomas Lee Schick, Arvada, CO (US)

(73) Assignee: Seagate Technology LLC, Cupertino, CA (US)

( * ) Notice: Subject to any disclaimer, the term of this patent is extended or adjusted under 35 U.S.C. 154(b) by 69 days.

(21) Appl. No.: 13/469,554

(22) Filed: May 11, 2012

(65) Prior Publication Data

US 2013/0301156 A1 Nov. 14, 2013

(51) Int. Cl.
*G11B 5/02* (2006.01)
(52) U.S. Cl.
USPC ................................... 360/68; 360/46

(58) Field of Classification Search
USPC .......................................... 360/31, 46, 67, 68
See application file for complete search history.

(56) References Cited

U.S. PATENT DOCUMENTS

| | | | |
|---|---|---|---|
| 5,910,861 A * | 6/1999 | Ahn ................................ | 360/46 |
| 7,133,234 B2 | 11/2006 | Bloodworth et al. | |
| 7,355,804 B1 * | 4/2008 | Kassab et al. ................... | 360/46 |
| 7,817,368 B1 | 10/2010 | Han | |
| 7,839,589 B2 | 11/2010 | Barnett et al. | |
| 2005/0207053 A1 * | 9/2005 | Barnett et al. .................... | 360/68 |
| 2007/0258341 A1 * | 11/2007 | Lin ............................ | 369/47.51 |
| 2013/0050866 A1 * | 2/2013 | Matsubara et al. ............... | 360/31 |

* cited by examiner

*Primary Examiner* — Thang Tran
(74) *Attorney, Agent, or Firm* — Hollingsworth Davis, LLC (57) ABSTRACT

A first parameter associated with a writer preamp is defined. A write current of the writer preamp is adjusted in accordance with the first parameter so that an asymmetric signal is applied at a write head. The asymmetric signal results in symmetric writing of bits to a medium.

20 Claims, 6 Drawing Sheets

ADJUSTING A PREAMP WRITE CURRENT TO APPLY AN ASYMMETRIC SIGNAL AT A WRITE HEAD

SUMMARY

Various embodiments described herein are generally directed to methods, systems, and apparatuses that facilitate adjusting a preamp write current to apply an asymmetric signal at a write head. In one embodiment, a method involves defining a first parameter associated with a writer preamp and adjusting a write current of the writer preamp in accordance with the first parameter so that an asymmetric signal is applied at a write head. The asymmetric signal results in symmetric writing of bits to a medium. In another embodiment, an apparatus includes a register that enables setting a first parameter associated with a writer preamp. A circuit of the apparatus is coupled to adjust a write current of the writer preamp in accordance with the first parameter so that an asymmetric signal is applied at a write head such that the asymmetric signal results in symmetric writing of bits to a medium.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates generally to write preamplifiers (hereinafter also referred to as "preamps") used for purposes such as writing to a data storage medium. For example, a hard drive may include one or more magnetic disks on which data is written by way of patterns of varying magnetic polarity on a surface of the media. A small electromagnetic transducer (e.g., write head) causes changes in magnetic polarity in response to an alternating current (e.g., write signal) applied to the transducer while the transducer is positioned near the moving surface of the medium.

A media writing device such as a hard drive may include one or more write preamps that provide a desired electrical signal to the write head. The preamps may control such parameters as maximum current/voltage, maximum and/or minimum overshoot, etc. The preamp may provide other functions such as filtering and analog signal conditioning. Generally, the preamp may be coupled to the write head by a signal path extending from a circuit board of the device to the write head, which may located at the end of a movable, hard drive, actuator arm.

The signal path may introduce loads on the write signal that cause an output at the write head to differ from the output at the preamp. As a result, a preamp may contain circuitry for compensating for a particular signal path. For example, signal path may cause a symmetric signal exiting the preamp to be asymmetric around a reference DC voltage level (e.g., 0 volts) as the signal is applied at the write head. The preamp may include provisions for adjusting the preamp output so that the signal entering the write head is symmetric around this common voltage level.

As data densities for magnetic media have increased, the area available to store a single bit has decreased. Because these smaller areas have correspondingly smaller magnetic fields, both the read and write circuitry may have to deal with interference and noise that is increased relative to the recorded signal. Another issue caused by decreasing bit size is an increased sensitivity to magnetic anisotropy that may affect read/write heads and the media. Magnetic anisotropy generally refers to a magnetic material responding differently to an applied magnetic field depending on direction of the field, e.g., whether the field is positive or negative. Anisotropy may be caused, among other things, by a directional dependence on of the materials used in the heads/and or media. Magnetic anisotropy may result in unequal recording performance for positive and negative bits, even when the currents waveforms applied at the write head are symmetric. This inequality in signal levels of positive and negative bits may result in an increase in bit error rate.

In the discussion that follows, methods, systems and apparatuses are described that compensate for magnetic anisotropy in the record head and/or medium. Generally, a preamp includes features for applying an asymmetric signal to a write head, thereby compensating for magnetic anisotropy of the head and/or medium. This differs from conventional arrangements, e.g., where the system attempts to apply symmetric signals to the write head. This compensation may be applied during both write and/or degauss operations of the write head.

Figure 1:
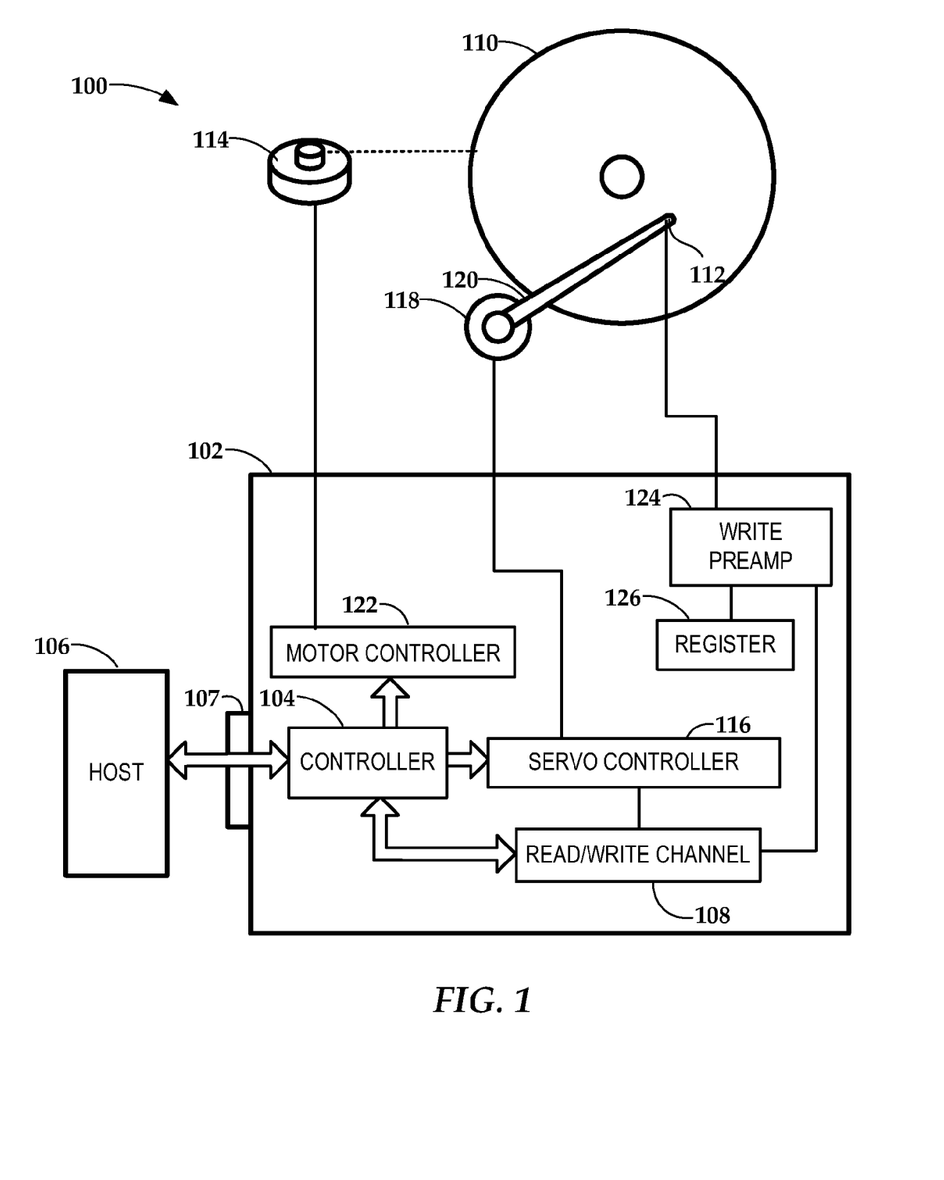
FIG. 1 is a block diagram of an apparatus according to an example embodiment.

In reference now to FIG. 1, a block diagram illustrates components of a hard drive apparatus 100 according to an example embodiment. It will be appreciated that this and other embodiments may be described herein as hard drive apparatuses for purposes of illustration, and not of limitation. The concepts described may be applicable to any data storage apparatus that is subject to magnetic anisotropy of a magnetic media and/or magnetic transducers. For example, magneto-optical devices may write to a medium using both a light source (e.g., a laser) and an applied magnetic field.

The apparatus 100 includes circuitry 102 that is coupled to electromechanical components. The circuitry 102 includes a controller 104 that controls a number of functions of the apparatus 100, including communications between the apparatus 100 and a host device 106 via a host interface 107. The host device 106 may include any electronic device that can be communicatively coupled to store and retrieve data from an HDD, e.g., a computer. The controller 104 may carry out write commands by formatting the associated data into sectors with the appropriate header information, and transferring the formatted data via a read/write channel 108 to the data storage surface of a disk 110. The controller 104 may provide analogous functions for read commands, e.g., determining the location of the desired data, moving the heads to the location (track) of the data, reading the data from the disk 110 via the read/write channel, correcting any errors and formatting the data for the host 106, etc.

The read/write channel 108 converts data between the digital signals processed by the data controller 104 and the analog signals conducted through read/write heads 112. The read/write channel 108 also provides servo data read from the disk 110 to a servo controller 116. The servo controller 116 uses these signals to drive an actuator 118 (e.g., voice coil motor, or VCM) that rotates an arm 120, upon which the read/write heads 112 are mounted. The heads 112 are moved radially across different tracks of the disk(s) 110 by the actuator motor 118 (e.g., voice coil motor), while a spindle motor 114 rotates the disk(s) 110. The data controller 104 controls the spindle motor 114 by way of a motor controller 122.

The read/write channel 108 provides analog write signals that are delivered to the write head 112 by way of a write preamp 124. The write preamp 124 amplifies and conditions the write signals so that magnetic fields generated at the write head 112 are of a duration and magnitude that results in efficient storage of data on the magnetic surfaces of the disk 110. For example, the preamp 124 may condition the write signal to account for load characteristics (e.g., resistance, capacitance, inductance) of the signal path that couples the write head 112 to the preamp 124, and for characteristics of the write head 112 itself.

In the illustrated embodiment, the preamp 124 also includes features to facilitate causing an electrical signal applied at the write head 112 to be asymmetric, e.g., to account for anisotropy of the magnetic medium 110 and/or write head 112. This asymmetry may be controlled by way of one or more memory registers 126. This register 126 may be used to statically or dynamically adjust asymmetry of the analog write signal. For example, a manufacturer may be able to determine a nominal setting that accounts for magnetic anisotropy among a batch of devices. These settings may be further adjusted on a per device basis, e.g., to account for environmental factors, manufacturing irregularities, etc. These adjustments could be performed during manufacture or post-manufacturing. The adjustments may be made automatically in response to feedback information that may detect or infer, e.g., adjacent track erasure, weakly recorded bits, etc.

Figure 2A:
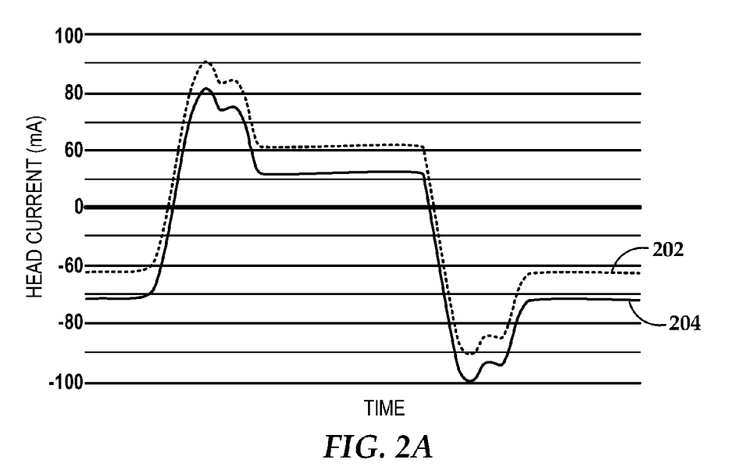
FIG. 2A is a graph of an asymmetrical write signal according to an example embodiment.

In reference now to FIG. 2, a graph illustrates an example of an asymmetric write signal according to an example embodiment. In the field of magnetic recording, it has generally been the goal to construct write preamp drivers to ensure symmetric signals (e.g., signal 202) are applied to the write head for recording data bits. However, applying symmetric signals at the write head does not account for magnetic asymmetries (e.g., anisotropy) in the head and recording medium. Magnetic anisotropy can result in unequal recording capability for positive and negative bits when standard symmetric write current waveforms are applied. Inequality in positive and negative bits affects the final bit error rate (BER).

Figure 2B:
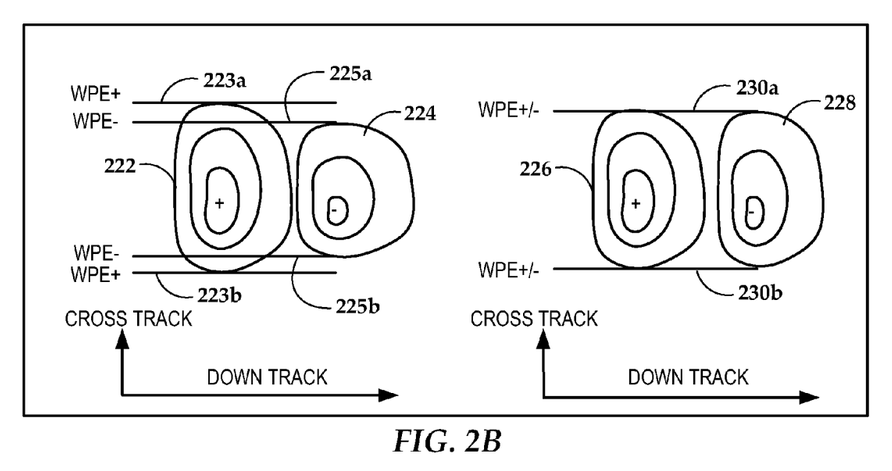
FIG. 2B is a diagram of magnetic field contours written to a magnetic medium according to an example embodiment.

Both the head and media may have a measureable anisotropy that causes negative transitions to be recorded more easily than positive transitions (or vice versa). Consequently, the current required to saturate some bits may be less than amount needed to saturate bits of opposite polarity. This is seen in FIG. 2B, which illustrates an magnetic filed contours of example adjacent positive and negative bits 222, 224. In this example, less current is required to write the positive bit 222 relative to the negative bit 224. A symmetric signal applied to the write head does not account for this anisotropy. As a result, the positive bit 222 may exhibit a larger Write Plus Erase (WPE) profile (as indicated by boundaries 223a-b) compared to the weakly written opposite polarity bit 224 (as indicated by boundaries 225a-b).

In order to overcome lack of saturation of the weakly written bit 224, the write current in both directions of symmetric signal (e.g., signal 202) may be increased to the point until all bits 222, 224 are in complete saturation. The downside of this increase is that bits of one polarity (in this case, the direction of bit 222) are now "over-saturated" and may erase data in the cross-track direction, and/or cause interference with those tracks. Higher areal density media may be more sensitive to cross track erasure/interference, because track spacing may be decreased in order to increase areal density.

As shown in FIG. 2B, symmetric write current waveform can produce asymmetric field contours 222, 224 on a recording medium if the heads/media are anisotropic. To overcome this problem, a preamp write driver can be designed with tunable positive or negative offsets in the write current. This programmable offset can be applied to both the steady state write current and overshoot portions of the waveform. For example, waveform 204 in FIG. 2A represents a tunable asymmetric write waveform according to an example embodiment. The asymmetric waveform 204 is shifted in a negative direction relative to symmetric waveform 202 to account for the anisotropy represented in bits 222, 224 of FIG. 2B. Resulting magnetic field contours are shown by way of bits 226, 228 in FIG. 2B. The WPE profile of both bits 226, 228 is approximately the same, as shown by WPE extents 230a-b.

Figure 3A:
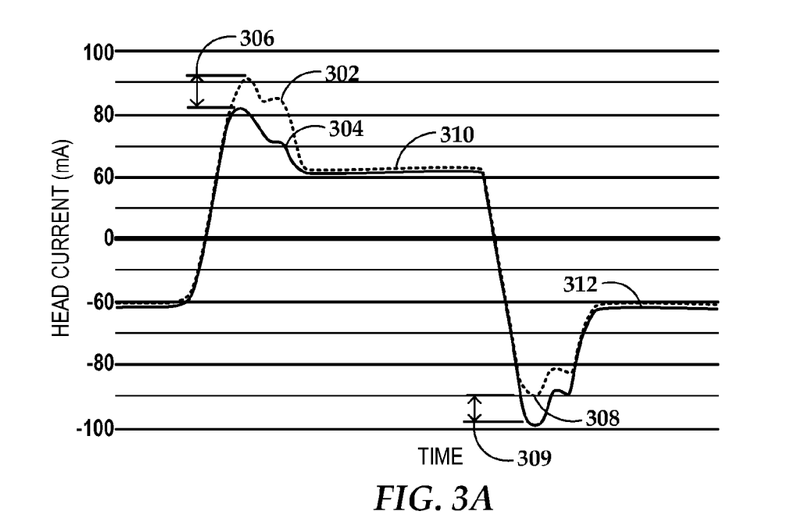
FIG. 3A is a graph of an asymmetrical write signal according to another example embodiment.

In FIG. 3A, a graph illustrates application of asymmetric overshoot to a write signal according to an example embodiment. Waveform 302 represents nominal, symmetric write signal, and waveform 304 represents an asymmetric positive overshoot. This may be considered a reduction in magnitude 306 of the overshoot, and not duration of the overshoot, although duration may also be affected together with or separately from overshoot magnitude. The negative overshoot current value 308 may also optionally be increased in this waveform 304 relative to the symmetric waveform 302 by increase in magnitude 309, which may be different from or similar to magnitude 306 of the positive overshoot. The steady state portion of waveform 304 (e.g., "flat" portions 310, 312) may be substantially unchanged. The adjustment seen with waveform 304 may be used to equalize field contours, such as shown by equalized bit patterns 226, 228 in FIG. 2B.

A data storage device may be enabled to facilitate programmed offsets of overshoot and/or steady-state asymmetry at any time in the life of the device. For example, asymmetry parameters in the write drivers may be set in drive certification, e.g., drive tuning as part of manufacture. In some arrangements, this type of adjustment may be applied post-manufacturing, e.g., dynamically adjusted by system to account for environmental conditions, or in response to diagnostic routines. These adjustments may be set to achieve maximum Areal Density Capability (ADC) for the storage device. The write driver controls may include independent positive and negative controls for adjusting any combination of waveform asymmetry parameters. Those parameters may include, but are not limited to, steady-state magnitude, overshoot magnitude, overshoot duration, rise time, fall time, bit duration, etc. Any combination of these parameters may be adjusted independently from one another, and from the same parameter in the positive and negative direction.

A preamp may be coupled to programmable registers (e.g., circuits that facilitate persistent storage of settings) that control the overall offset and the overshoot amplitude portion of the writer output. For example, Table 1 below illustrates registers that may be set in order to affect the desired preamp settings.

TABLE 1

Example Register Settings for Asymmetric Preamp Driver Control

| Master Enable (1 bit) | Overshoot Asymmetry register (3-bits) | DC Asymmetry register (3-bits) | Overshoot Asymmetry | DC Asymmetry | Overshoot Polarity | DC Polarity |
|---|---|---|---|---|---|---|
| 0 | Any | Any | OFF | OFF | Ignored | Ignored |
| 1 | 0 | 0 | OFF | OFF | Ignored | Ignored |
| 1 | ≠0 | 0 | ON | OFF | Active | Ignored |
| 1 | 0 | ≠0 | OFF | ON | Ignored | Active |
| 1 | ≠0 | ≠0 | ON | ON | Active | Active |

The first column in Table 1 represents a master enable bit. If this bit is set to zero, no asymmetry offsets are applied, and values of all other columns may be ignored. If the master enable is set to one, the write asymmetry features are enabled. The Overshoot Asymmetry and DC Asymmetry in columns 2 and 3 are multi-bit values that determine if overshoot and/or DC offsets are applied, and if so, how much. If Overshoot Asymmetry or DC Asymmetry are set to zero, then no overshoot amplitude adjustment or DC offset are applied. This is reflected in the fourth and fifth column of Table 1.

The second column of Table 1 describes an Overshoot Asymmetry word, which is a data value used to set an overshoot amplitude offset. In this embodiment, the Overshoot Asymmetry is an unsigned 4-bit word ranging from 0-15. The Overshoot Asymmetry value changes the offset in 1 mA steps, e.g., causing an overshoot offset between 0-15 mA. An additional bit, Overshoot Polarity shown in the sixth column of Table 1, is used to control the sign/direction of the Overshoot Asymmetry offset.

Figure 3B:
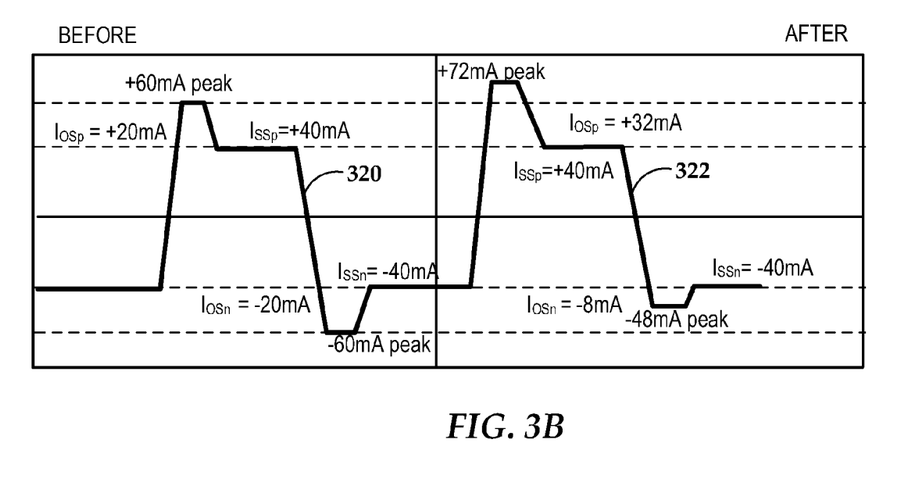
FIGS. 3B and 4A-4B are graphs illustrating changes to write signals in response to applying preamp symmetry parameters according to example embodiments.

An example of applying overshoot asymmetry according to an example embodiment is shown in the graph of FIG. 3B. On the left side of FIG. 3B, a symmetric current waveform 320 is shown without having any asymmetry adjustment applied, e.g., as might be seen with master enable set to zero and/or with Overshoot Asymmetry and DC Asymmetry both set to zero. Waveform 320 has positive and negative steady state write current ($I_{SSp}$ and $I_{SSn}$) of +40 mA and −40 mA, respectively. The overshoot values ($I_{OSp}$ and $I_{OSn}$) are +20 mA and −20 mA above the steady state write currents $I_{SSp}$ and $I_{SSn}$, therefore waveform 320 has peak values of +60 mA and −60 mA.

On the right side of FIG. 3B, a waveform 322 shows the results after setting Overshoot Asymmetry=12 and Overshoot Polarity to positive. In this example, there is no DC offset, so DC Asymmetry is set to zero, and DC Polarity would be ignored. As a result, the values of $I_{SSp}$ and $I_{SSn}$ remain at +40 mA and −40 mA, respectively. However, the overshoot values are now +32 mA and −8 mA, resulting in a positive peak of 40+32=+72 mA, and a negative peak of −40−8=−48 mA for waveform 322.

In reference now to the third column of Table 1, the DC Asymmetry bits control DC offset of the steady-state writer output, e.g., causing an asymmetry between $I_{SSp}$ and $I_{SSn}$. In this example, the DC Asymmetry is an unsigned 4-bit word ranging from 0-15. The DC Asymmetry value changes the DC offset in 1 mA steps, e.g., causing a DC offset between 0-15 mA. An additional bit, DC Polarity shown in the seventh column of Table 1, is used to control the sign/direction of the DC Asymmetry offset.

Figure 4A:
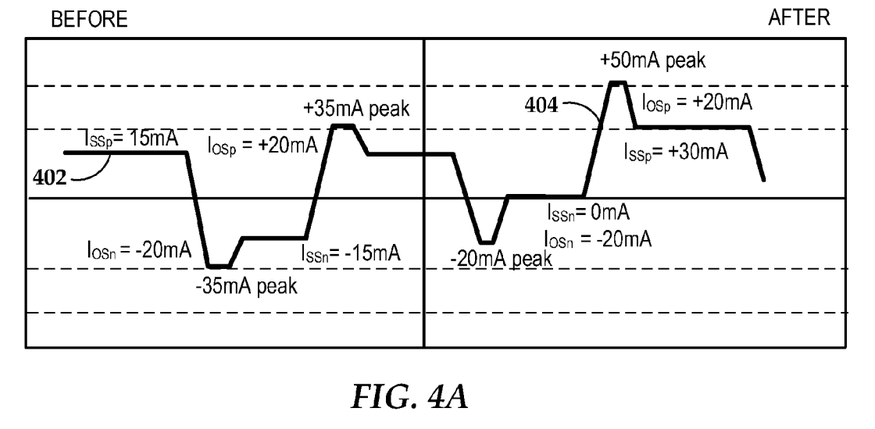

An example of applying DC offset asymmetry according to an example embodiment is shown in the graph of FIG. 4A. On the left side of FIG. 4A, a symmetric current waveform 402 is shown without having any asymmetry adjustment applied. Waveform 402 has positive and negative steady state write current ($I_{SSp}$ and $I_{SSn}$) of +15 mA and −15 mA, respectively. The overshoot values are +20 mA and −20 mA above the steady state write currents $I_{SSp}$ and $I_{SSn}$, resulting in peak values of +35 mA and −35 mA.

On the right side of FIG. 4A, a waveform 404 shows the results after setting DC Asymmetry=15 and DC Polarity set to positive. In this example, there is no overshoot offset, so Overshoot Asymmetry is set to zero, and Overshoot Polarity would be ignored. As a result, the overshoot values of $I_{OSp}$ and $I_{OSn}$ remain at +20 mA and −20 mA, respectively. However, the $I_{SSp}$ and $I_{SSn}$ values are now +30 mA and 0 mA, resulting in a positive peak of 30+20=+50 mA, and a negative peak of 0−20=−20 mA.

It should be noted that the waveform 404 represents a special case where the DC offset is equal to $I_{SSp}$, thereby causing $I_{SSn}$ to be equal to 0 mA. The embodiments described herein may have provisions to prevent the DC Asymmetry from exceeding $I_{SS}$, which could cause both $I_{SSp}$ and $I_{SSn}$ to be either positive or negative. The preamp may be configured to prevent the user from setting both sides of write current to be above or below 0 mA. This may involve ignoring values of DC Asymmetry>$I_{SS}$, or only applying the full value of DC Asymmetry to one of $I_{SSp}$ and DC $I_{SSn}$ while the other is limited to 0 mA.

Figure 4B:
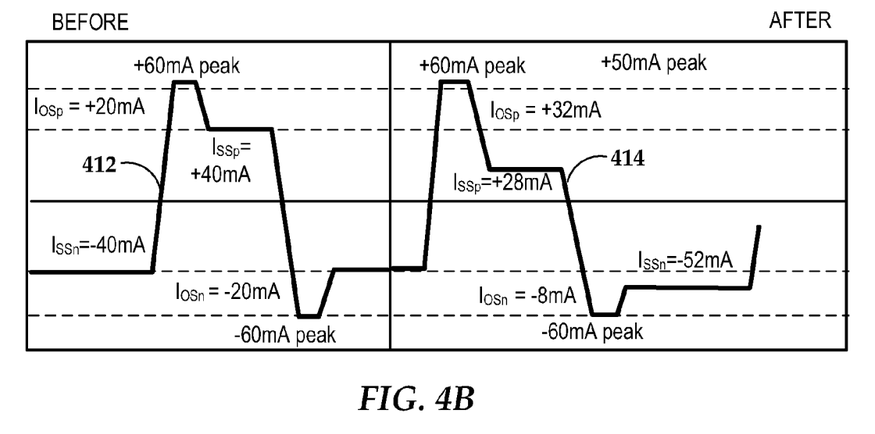

An example of applying both overshoot and DC offset asymmetry according to an example embodiment is shown in the graph of FIG. 4B. On the left side of FIG. 4B, a symmetric current waveform 412 is shown without having any asymmetry adjustment applied. Waveform 412 has positive and negative steady state write current ($I_{SSp}$ and $I_{SSn}$) of +40 mA and −40 mA, respectively. The overshoot values are +20 mA and −20 mA above the steady state write currents, resulting in peak values of +60 mA and −60 mA.

On the right side of FIG. 4B, a waveform 414 shows the results after setting DC Asymmetry=12, DC Polarity set to negative, Overshoot Asymmetry=12, and Overshoot Asymmetry set to positive. As a result of these settings, the $I_{SSp}$ and $I_{SSn}$ values are now +28 mA and −52 mA, respectively, and the values of $I_{OSp}$ and $I_{OSn}$ are changed to +32 mA and −20 mA, respectively. This results in a positive peak of 28+32=+60 mA, and a negative peak of −52−8=−60 mA. As a result of these settings the peak values are the same in both waveforms 412, 414, yet the shapes are substantially different.

Both Overshoot Asymmetry and DC Asymmetry may be used simultaneously (DC offset plus overshoot asymmetry), as represented by the last row of Table 1. The last two columns of Table 1 represent bits for setting a polarity of the overshoot amplitude and DC offset, respectively. Each of these bits can be set independently of each other. Finally, as previously noted, when the master enable bit or the control bits are zero (off), the writer output is to be controlled with no offsets, e.g., symmetrical waveform applied to the write head.

The asymmetry setting features described above may also affect degauss operations. A degauss with asymmetry may be optional or required to remove remnant states that exist in heads after writing, such as when considering intrinsic anisotropy in the medium and/or write head. For example, a degauss operation may start at an offset current programmed into the writer. In such a case, the degauss will gently taper to 0 mA, avoiding any abrupt transitions to 0 mA and without creating any common mode occurrences on the writer outputs. If the waveform is programmed with an overshoot asymmetry, the degauss operation may gently return the overshoot asymmetry to zero as the waveform decays to 0 mA as well. If the waveform is programmed with DC offset asymmetry, both negative and positive portions of the waveform should decay to zero over the same time frame. This may be equivalent to using different resistive-capacitive (RC) time constants for the negative and positive parts of the waveform. The degauss asymmetry adjustments may be similar to write symmetry adjustments, or may be made independent of one another (e.g., a separate set of registers for controlling degauss asymmetry).

Figure 5A:
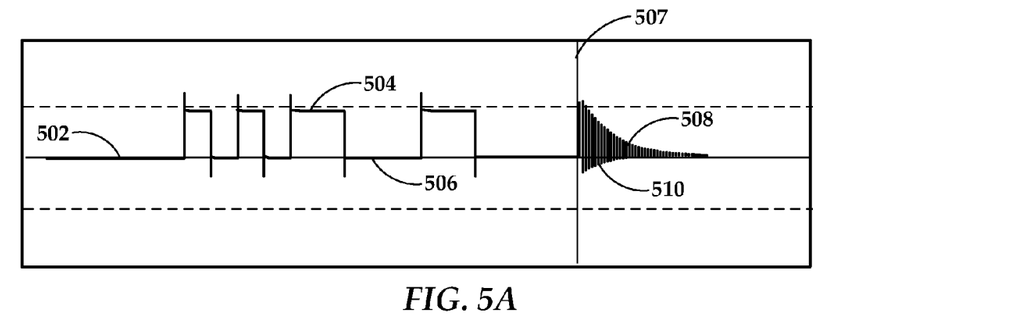
FIGS. 5A-5B are graphs illustrating changes to degauss signals in response to applying preamp symmetry parameters according to example embodiments.

In reference now to FIG. 5A, a graph illustrates a degauss waveform 502 according to an example embodiment. In this example, $I_{SSp}$ and $I_{SSn}$ are +15 mA respectively, and overshoot values are +12 mA. Only DC offset asymmetry is used, specifically with DC Asymmetry=15 mA in the positive direction. This leads to adjusted values of $I_{SSp}$=+30 mA and $I_{SSn}$=0 mA, as represented in the graph at portions 504 and 506 of the waveform, respectively. The degauss is initiated at time instant 507, after which the waveform 502 decays from peak negative and positive values to zero. As seen by respective top and bottom profiles 508, 510, the positive and negative sides of the waveforms decay at different rates due to the DC Asymmetry offset.

Figure 5B:
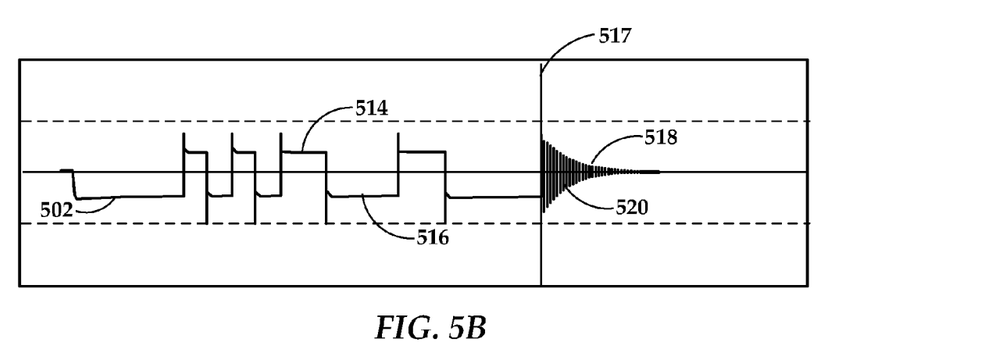

In reference now to FIG. 5B, a graph illustrates a degauss waveform 512 according to an example embodiment. In this example, the DC offsets are +37 mA, and overshoot are +35 mA. Both DC offset and overshoot asymmetry are used, with DC Asymmetry=7 mA in the negative direction, and OWA_ASYM=6 mA in the negative direction. This leads to adjusted values of $I_{SSp}$=+30 mA and $I_{SSn}$=−44 mA, e.g., as indicated in the figure at portions 514 and 516 of the waveform, respectively. The degauss is initiated at time instant 517, after which the waveform 502 decays from peak negative and positive values to zero. As seen by respective top and bottom profiles 518, 520, the positive and negative sides of the waveforms decay at different rates due to the DC Asymmetry and Overshoot Asymmetry offsets. This difference is not as pronounced as seen in FIG. 5A, due to the relatively large values of $I_{SS}$ in FIG. 5A compared to DC Asymmetry in this example.

Figure 6:
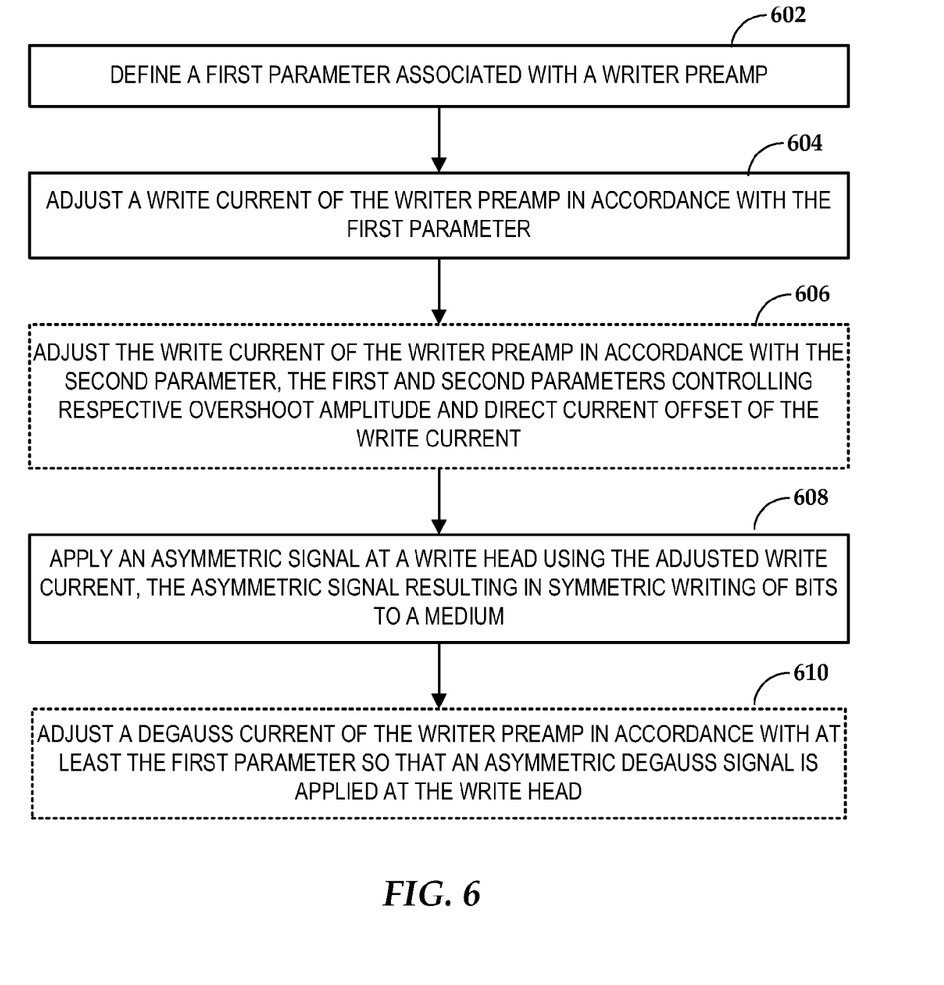
FIG. 6 is a flowchart illustrating a procedure according to an example embodiment.

In reference now to FIG. 6, a flowchart illustrates a procedure according to an example embodiment. The procedure involves defining 602 a first parameter associated with a writer preamp, and adjusting 604 a write current of the writer preamp in accordance with the first parameter. The write current may also optionally be adjusted 606 based on a second parameter. The first and second parameters may control respective overshoot amplitude and direct current offset of the write current. These and other parameters may also be used to control one or more of overshoot duration and write current rise time of the write current. An asymmetric signal is applied 608 at a write head in accordance with the adjusted current. The asymmetric signal results in symmetric writing of bits to a medium. The asymmetric signal may compensate for magnetic anisotropy in the medium and/or the write head. These parameters may also be optionally used to adjust 610 a degauss current of the writer preamp in accordance with the first parameter so that an asymmetric degauss signal is applied at the write head.

The various embodiments described above may be implemented using circuitry, firmware, and/or software modules that interact to provide particular results. One of skill in the arts can readily implement such described functionality, either at a modular level or as a whole, using knowledge generally known in the art. The structures and procedures shown above are only a representative example of embodiments that can be used.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   defining a first parameter associated with a writer preamp; and
   adjusting a write current of the writer preamp in accordance with the first parameter so that an asymmetric signal is applied at a write head, wherein the asymmetric signal results in symmetric writing of bits to a medium.

2. The method of claim 1, wherein the asymmetric signal compensates for magnetic anisotropy in the medium.

3. The method of claim 1, wherein the asymmetric signal compensates for magnetic anisotropy in the write head.

4. The method of claim 1, wherein the first parameter controls a direct current offset of the asymmetric signal.

5. The method of claim 4, further comprising adjusting the write current in accordance with a second parameter that controls an overshoot amplitude of the asymmetric signal.

6. The method of claim 1, wherein the first parameter controls an overshoot amplitude of the asymmetric signal.

7. The method of claim 1, wherein the first parameter controls one or more of overshoot duration and write current rise time of the asymmetric signal.

8. The method of claim 1, further comprising adjusting a degauss current of the writer preamp in accordance with the first parameter so that an asymmetric degauss signal is applied at the write head.

9. An apparatus comprising:
   a register that enables setting a first parameter associated with a writer preamp;
   a circuit coupled to adjust a write current of the writer preamp in accordance with the first parameter so that an asymmetric signal is applied at a write head, wherein the asymmetric signal results in symmetric writing of bits to a medium.

10. The apparatus of claim 9, wherein the asymmetric signal compensates for magnetic anisotropy in the medium.

11. The apparatus of claim 9, wherein the asymmetric signal compensates for magnetic anisotropy in the write head.

12. The apparatus of claim 9, wherein the first parameter controls a direct current offset of the asymmetric signal.

13. The apparatus of claim 12, further comprising adjusting the write current in accordance with a second parameter that controls an overshoot amplitude of the asymmetric signal.

14. The apparatus of claim 9, wherein the first parameter controls an overshoot amplitude of the asymmetric signal.

15. The apparatus of claim 9, wherein the first parameter controls one or more of overshoot duration and write current rise time of the asymmetric signal.

16. The apparatus of claim 9, further comprising adjusting a degauss current of the writer preamp in accordance with the first parameter so that an asymmetric degauss signal is applied at the write head.

17. A system comprising:
   a magnetic write head; and
   a magnetic writer preamp coupled to the magnetic write head, the magnetic writer preamp comprising:
      means for defining a first parameter associated with an output signal of the magnetic writer preamp; and
      means for adjusting the output signal in accordance with the first parameter so that an asymmetric signal is applied at the magnetic write head, wherein the asymmetric signal results in symmetric writing of bits to a magnetic medium via the magnetic write head.

18. The system of claim 17, wherein the asymmetric signal compensates for magnetic anisotropy in the medium.

19. The system of claim 17, wherein the asymmetric signal compensates for magnetic anisotropy in the write head.

20. The system of claim 17, further comprising means for adjusting a degauss current of the writer preamp in accordance with the first parameter so that an asymmetric degauss signal is applied at the write head.

* * * * *